United States Patent [19]
Vencill et al.

[11] Patent Number: 5,658,053
[45] Date of Patent: Aug. 19, 1997

[54] SHAFT RE-GREASING HUB

[76] Inventors: R. Lee Vencill; Robert E. Vencill, both of P.O. Box 63, Williams, Oreg. 97544

[21] Appl. No.: 410,510

[22] Filed: Mar. 24, 1995

[51] Int. Cl.$^6$ ............................................. B60B 27/00
[52] U.S. Cl. .......................... 301/105.1; 301/131; 384/462
[58] Field of Search ........................ 301/105.1, 124.1, 301/131; 384/462, 473; 184/5.1

[56] References Cited

U.S. PATENT DOCUMENTS

| | | | |
|---|---|---|---|
| 1,823,422 | 10/1931 | Bock | 384/473 |
| 2,249,501 | 7/1941 | Teker | 308/187 |
| 2,337,403 | 12/1943 | Myers et al. | 384/473 |
| 2,504,094 | 4/1950 | Turner et al. | 384/462 |
| 2,514,799 | 7/1950 | Rubertino et al. | |
| 2,532,605 | 12/1950 | Castleberry | |
| 3,903,992 | 9/1975 | Chivukula et al. | 184/1 |
| 3,932,006 | 1/1976 | Tertinek et al. | 308/187 |
| 4,636,007 | 1/1987 | Persons | 301/105 |
| 4,883,368 | 11/1989 | Stein | 384/458 |
| 4,988,218 | 1/1991 | Quaglia | 384/322 |
| 5,098,168 | 3/1992 | Johnson | 301/124 R |
| 5,174,839 | 12/1992 | Schultz et al. | 152/415 |
| 5,322,373 | 6/1994 | Oakes et al. | 384/462 |

*Primary Examiner*—David M. Mitchell
*Assistant Examiner*—Jonathan J. Yun
*Attorney, Agent, or Firm*—Eugene M. Eckelman

[57] ABSTRACT

A hub for greasing inner and outer shaft bearings on a spindle having greasing passageways leading in from the front of the hub. One passageway leads to the front of the outer bearing and the other passageway leads to the rear of the inner bearing. A purging passageway is provided between the inner and outer bearings whereby upon pressured grease being forced into greasing passageways in the direction of the purging passageways, new grease is forced in an axial direction through the bearings and old grease and contaminants are purged. An annular seal between the bearings provides the purging passageway with the spindle, such passageway being next to the shaft for maintaining a supply of grease on the shaft. The seal has at least one annular recess for providing additional storage of grease. Grease holding areas are provided adjacent the bearings such that grease is forced into the bearings by centrifugal force when the hub rotates on the spindle. Ventilating openings are provided to prevent buildup of pressure in the hub. A non-ventilating cavity forming plug is provided for substitution of the ventilating plug during a greasing operation.

12 Claims, 3 Drawing Sheets

SHAFT RE-GREASING HUB

BACKGROUND OF THE INVENTION

This invention relates to new and useful improvements in a shaft re-greasing hub and is particularly adaptable for greasing wheel bearings.

Wheel hubs, particularly truck and trailer hubs, are difficult and time consuming to pack with grease. It usually requires removal of the hub cap, the wheel or dual wheels, the brake drum or rotor, the hub, the inner lubrication seal, and the bearings.

DESCRIPTION OF BACKGROUND ART

Currently, the industry favors oil for lubricating wheel hubs since oil provides two advantages over the earlier procedure of packing with grease. These advantages are: 1) The oil level in the hub can be easily maintained to assure that the bearing is in fact lubricated and 2) Slightly improved cold weather fuel mileage is obtained due to less stiffness of the oil. This presently popular system does not, however, have a service life equal or greater than the service life of modern extended life braking components. Vehicle supplementary braking systems such as engine brakes further extend brake life. Any seal failure or seepage wets the brake and can lead to a citation, and the necessity of immediate repair. Furthermore, oil leakage may result in bearing failure, a brake failure or even a brake and wheel fire. Consequently, wheel end maintenance with oil as to the lubricant is very costly in the long run and a preventive maintenance program is difficult to pursue in which the full service life of all the related components can be utilized as it becomes necessary to either perform re-work or to prematurely replace components.

Devices have heretofore been patented to ease the task of greasing shaft bearings, including wheel bearings. For example, U.S. Pat. No. 4,636,007 relates to a hub design seeking to permit the application of grease directly at each of the inner and outer bearings. Grease ports are accessible from the front of the wheel and channel grease to the inner and outer bearings. Structure shown in this patent has inherent disadvantages, one disadvantage being that the hub permits re-packing the hub cavity with grease flow to and about the bearings but not axially through the bearings so that an efficient and complete purging of old grease cannot be accomplished as well as re-greasing. Another disadvantage of U.S. Pat. No. 4,636,007 is that the inner bearing chamber is not vented whereby when the warm hub, warm grease and other components are immersed in water, the water, being cooler, creates a vacuum. This vacuum draws water through the inner grease seal which of course is trapped within the wheel to cause rust, interference with lubrication, and the expelling of grease when warm.

U.S. Pat. No. 2,249,501 relates to supporting structures for rotating shafts and to lubricating systems for such supports. It is comprised of an oil reservoir system and a lubricant metering system to restrict and meter gravity fed oil to an anti-friction bearing. The used oil is then collected in a chamber beneath the bearing. This system requires continual monitoring.

U.S. Pat. No. 3,903,992 shows a device for greasing a single bearing on a shaft during shaft rotation. A grease slinger plate with a canted vein urges grease through the bearing and out the bearing housing cap discharge opening, while maintaining a breathing space in the non-vented stationary bearing housing.

U.S. Pat. No. 4,988,218 is directed to oil lubrication of bearings when oil is pumped and maintained under pressure through the axial shaft or hub face and through the bearings to the rear of the hub.

SUMMARY OF THE INVENTION

Recent developments in modern wheel bearing greases, particularly heavy duty synthetic greases, are found to have considerably less cold weather rolling resistance problems as compared to earlier wheel bearing greases, and applicant, according to an important object of the present invention, has taken advantage of such developments in grease to provide a specially designed hub with grease fittings and grease raceways such that efficient and fast packing of the wheel bearings can be accomplished from the exterior, namely, from the front, without wheel, brake, or hub removal.

Another object is to provide a hub that is vented and non-pressurized during operation with a wheel, that stops seepage of lubricant through seals, protecting brake components while maintaining the hub bearing in a grease raceway providing optimum lubrication.

Still another object of the invention is that the greasing structure permits the bearings to be re-greased and the old grease examined for foreign material during scheduled preventative maintenance servicing. It is estimated that use of the present hub may permit the industry to save 75% of present related costs.

The invention will be better understood and additional objects and advantages will become apparent from the following description taken in connection with the accompanying drawing.

DESCRIPTION OF PREFERRED EMBODIMENTS

Figure 1:
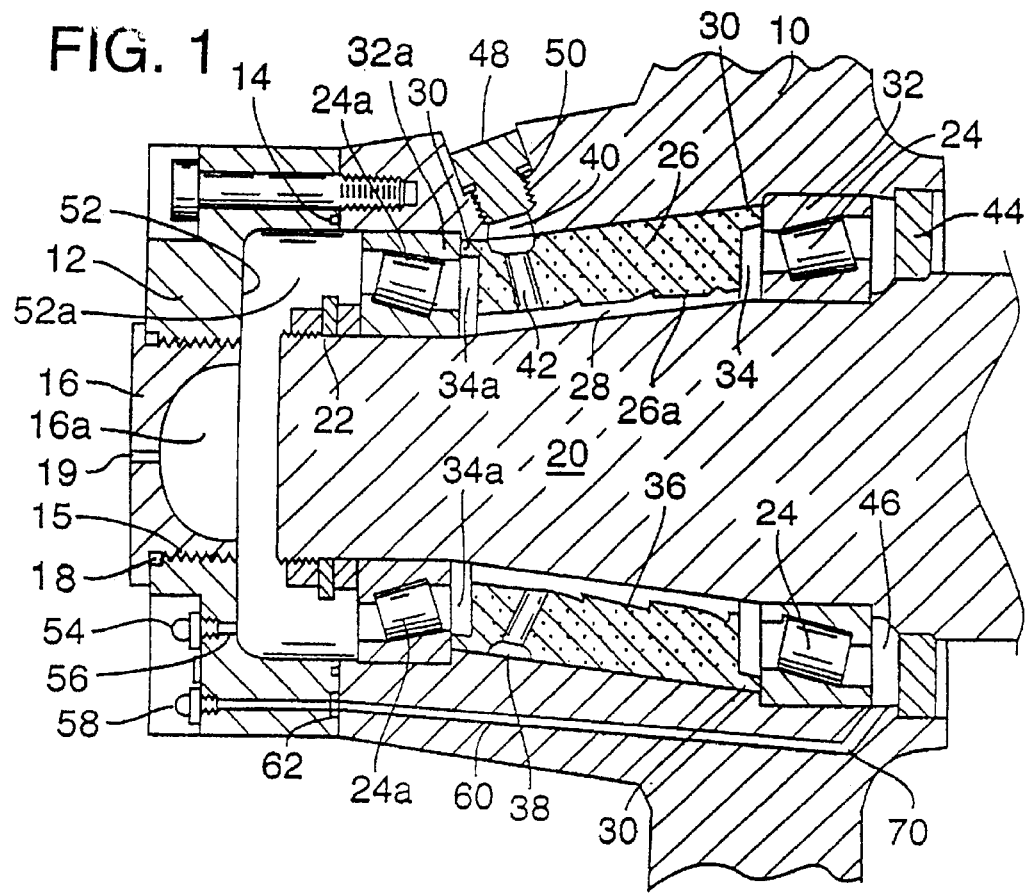
FIG. 1 is a longitudinal sectional view of the present hub and a spindle mounting thereof.

With particular reference to the drawings, FIG. 1 shows the working form of a first embodiment of the present hub in a fully greased condition. It comprises a hub 10 having an outer end cap 12 with an O-ring seal 14 therebetween. The outer end of the cap has an opening 15 for removably receiving a plug 16 with an O-ring seal 18 at the opening. Plug 16 has a small axial vent port 19 and the inner surface thereof has a deepened concavity recess 16a. The numeral 20 designates the usual spindle and the numeral 22 designates the usual end nut retaining assembly.

The present hub encloses the usual inner and outer bearings 24 and 24a, respectively, and includes an interior annular seal 26 about the spindle 20 between the inner and outer bearings. The seal is tapered similar to the spindle and has a central bore 26a of reduced diameter and radial dimension to provide a circumferential grease purging passage 28 around the spindle 20. The outer surface of this seal has engagement against the inner bore of the hub body 10 and the ends thereof have longitudinal extensions 30 with edge engagement against outer raceways 32 and 32a of bearings 24 and 24a, respectively. Extensions 30 create circumferential inner and outer grooves 34 and 34a around the inner surfaces of bearings 24 and 24a, respectively. The inner surface or bore 26a of the seal has multiple annular grooves 36 for the storage of additional grease. Interior annular seal 26 has one outer circumferential groove 38 that communicates with a purging port 40 in the hub body 10 and communicates with radial ports 42 in annular seal 26 in turn opening to grease pathway 28. The numeral 44 designates the usual lubricant seal at the inner end of the hub. The present hub is designed to leave a circumferential greasing area 46 between oil seal 44 and the inner bearing 24.

In running operation of the hub, a sealing plug 48 and an O-ring 50 seal port 40. The end cap 12 has a recess 52 on its inner face which cooperates with the recess 16a in the end cap plug 16 to form an enlarged inner cavity 52a that communicates with the front of the outer bearing 24a.

A first grease fitting 54 is mounted in the outer end cap 12 and communicates with a port or passageway 56 which leads to inner cavity 52a. A second grease fitting 58 is also mounted in end cap 12 and communicates with an elongated port or passageway 60 and junction 70 that lead to the circumferential area 46 between the inner bearing 24 and seal 44. Port 60 is sealed by O-ring 62 at the mating surfaces of hub body 10 and end cap 12. Grease fittings 54 and 58 are recessed in the end cap 12 for protection.

REGREASING OPERATION

Figure 2:
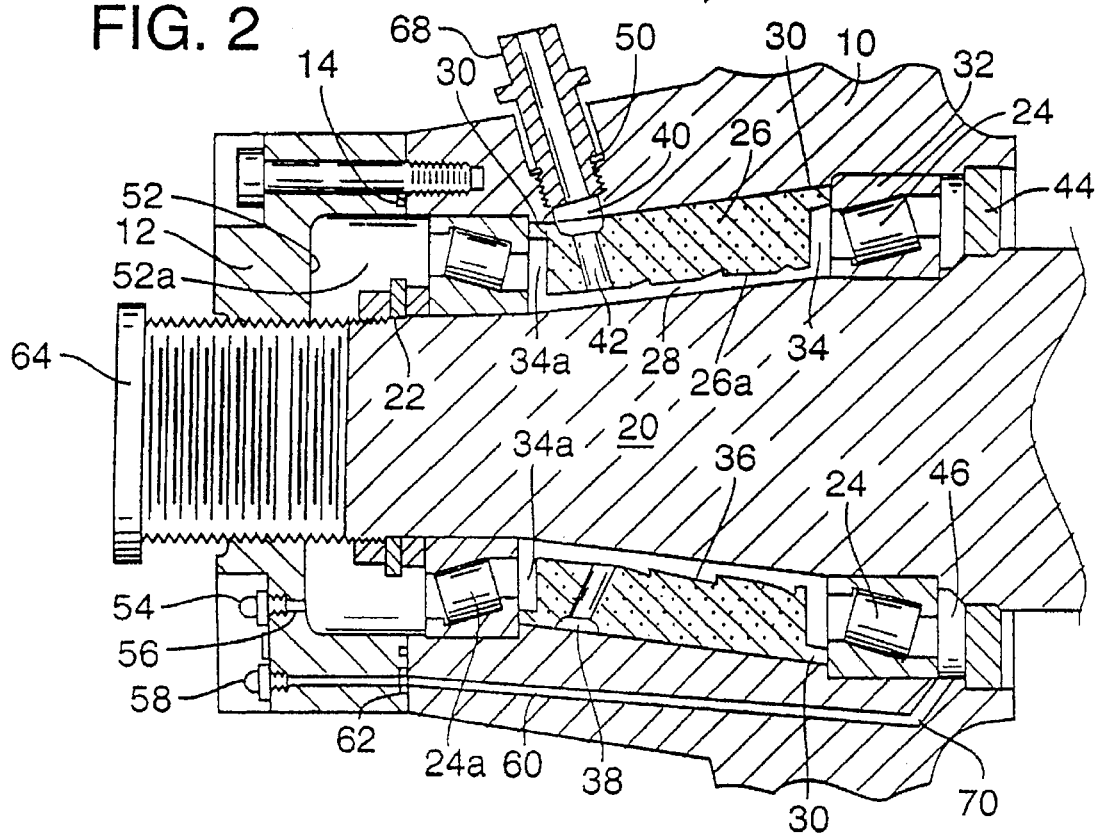
FIG. 2 is a view similar to FIG. 1 but including special servicing fittings used with the invention in repacking the hub wheel bearings from the exterior without removal of the wheel.

In the function of applying new grease, reference is made to FIG. 2. First, an outer surface sealing plug 64 is installed in place of the hub end cap vent plug 16. Plug 64 is not vented and seals cavity 52a. It is fully threaded and driven inwardly in abutting relation against the end of the spindle. The plug 64 fills some of the recess 52 and saves grease in the process of greasing. Plug 48 in outlet 40 is removed and a purging grease collection tube 68 is fitted in place of plug 48. Thereupon, a grease gun is connected to one of the fittings 54 or 58, for example, the fitting 54. Upon pressured insertion of grease through this fitting, grease fills cavity 52a at the outer bearing 24a. New grease flows longitudinally or in other words in an axial direction through outer bearing 24a, completely flowing through the bearing and displacing old grease. Grease then gathers in end groove 34a on interior seal 26, then flows through passage 28 where the used grease flows through radial ports 42 to collection groove 38 and is expelled from the hub by way of purging port 40 and servicing purging tool 68. Thereupon, the other grease fitting 58 is utilized to direct grease through the longitudinal port 60 to circumferential area 46 at the rear of the inner bearing 24. New grease flows longitudinally or in other words in an axial direction through bearing 24, into end groove 34 in seal 26, through passageway 28 and out radial ports 42 to the purging tool. In accordance with varying applications, the hub may have multiple sets of inner and outer greasing fittings 54 and 58 and respective longitudinal ports. Port 60 may branch into multiple ports at junction 70 to uniformly communicate with circumferential greasing space 46. With the insertion of grease through the end cap grease fittings 54 and 58, grease packs both inner and outer bearings individually with new grease. Grooves 34 and 34a are packed with grease as are the portions of cavity 52a around the service sealing plug 64, the greasing areas 46 behind bearings 24, grease passageway 28, and annular grooves 36 in the seal 26.

After packing the above areas, the sealing plug 64 is removed and the end cap vented plug 16 is installed. Center recess or void 16a becomes a vented expansion area. Purge tool 68 is removed and plug 48 is reinstalled.

In operation, centrifugal force from rotation of the hub maintains grease in outer radial areas of cavity 52a and in inner area 46 against their respective bearings. Also maintained in usage is end cap interior expansion area 16a that assures fully vented non-pressured lubrication to minimize seepage or failure of inner seal 44. Furthermore, in the event of bearing failure, a catastrophic type failure is reduced to a much less expensive repair by virtue of hub interior seal 26 functioning as a fail-safe sleeve bearing for the spindle and hub. This reduces the risk of hub-wheel-tire to axle separation. The annular grooves 36 in the seal 26 hold lubricant to further protect from further damage a fail/safe operation. The design of the hub maintains the bearing in a grease raceway free of voids and contaminants in a vented non-pressured hub, thusly maintaining the integrity of lubrication and inner grease seals for extended service life and reduced wheel end maintenance costs.

Figure 3:
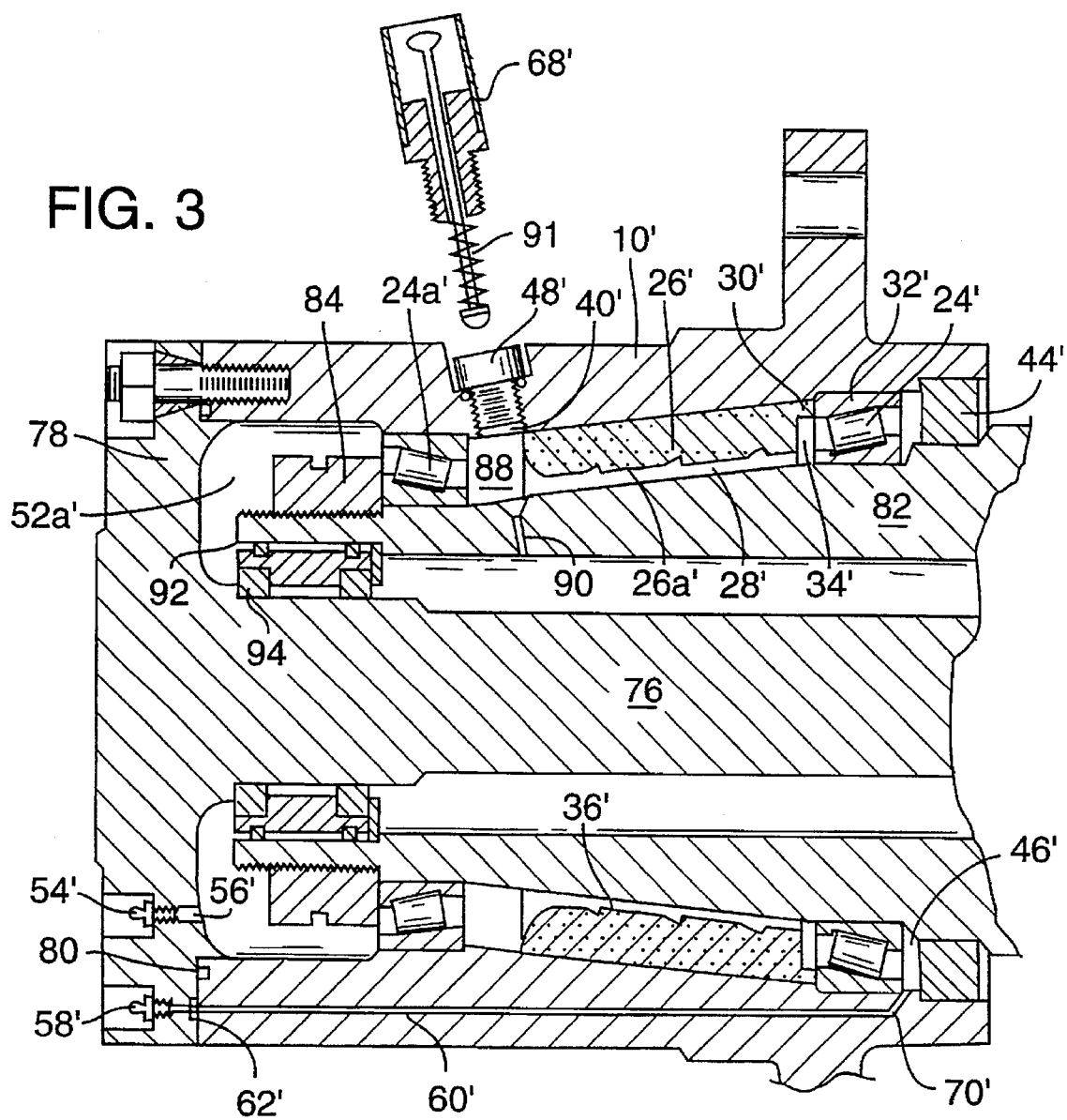
FIG. 3 is a longitudinal sectional view of a hub using the concept of the invention as applied to a drive axle spindle.

FIG. 3 shows an embodiment of the present invention as applied to a drive axle configuration. In this structure the drive axle 76 comprises a hub 10' removably connected to an end flange 78 of the drive axle with an O-ring seal 80 therebetween. The numeral 82 designates the usual annular drive axle housing spindle that forms with drive axle 76 a venting passageway to the drive axle housing, and the numeral 84 designates the end nut retaining assembly. Novel features of the instant invention are substantially the same in the embodiment of FIG. 3 as in the embodiment of FIG. 1 except that greasing portions of FIG. 3 are associated with the drive axle flange 78 and a drive axle housing spindle 82 instead of hub outer end cap 12 and spindle 20.

In this second form, the hub 10' encloses inner and outer bearings 24' and 24a', respectively, and provides an interior seal 26' about the spindle 82 between the inner and outer bearings. The seal has a central bore 26a' of tapered configuration and radial dimension to provide a circumferential grease passage 28' around the spindle 82. The outer surface of this seal has circumferential engagement against the bore in hub body 10' and the inner end thereof has radial extension 30' that engages the inner bearing outer raceway 32', creating a radial end groove 34' around the inner surface of inner bearing 24'. The inner conical surface of seal 26' has multiple annular grooves 36'. The outer edge of seal 26' communicates with a circumferential area 88 that in turn communicates with the inner face of outer bearing 24a'. Circumferential area 88 also communicates with grease passageway 28' as well with purging port 40' in hub body 10' and internal vent port 90. The numeral 44' designates the lubricant seal between the inner end of the hub and the spindle with a circumferential greasing area 46' between the lubricant seal 44' and the inner bearing 24'. The axial flange 78 encloses cavity 52a' that communicates between this flange and the front of the outer bearing 24a'.

A first grease fitting 54' is mounted on the face of drive axle flange 78 and leads to area 52' by means of a port or passageway 56'. A second grease fitting 58' is also mounted in the drive axle flange and communicates with an elongated port or passageway 60' that leads to the circumferential space 46' behind the inner bearing 24'. Port 60' is sealed by O-ring 62' at the mating surfaces of hub body 10' and the drive axle flange 78.

Figure 4:
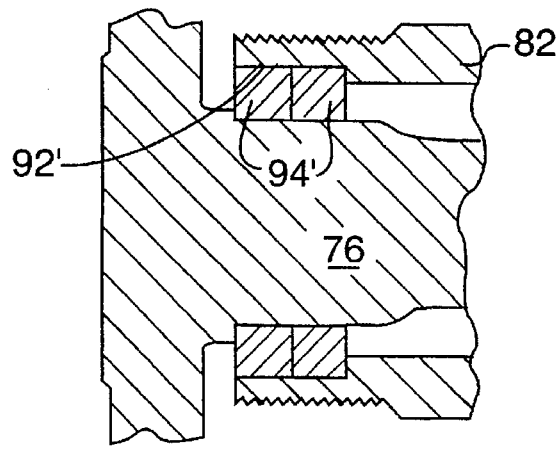
FIG. 4 is a fragmentary longitudinal sectional view of structure similar to FIG. 3 but showing an alternate drive axle sealing arrangement.

In the function of applying new grease, plug 48' that is mounted in outlet port 40' in operative running of the bearing is removed and combined purge grease collection and internal vent sealing tool 68' is fitted in the purging port 40'. The purge tool 68' for this embodiment includes a spring pressed plunger 91 that is in direct line with port 90 for sealing this port when the tool is inserted for regreasing. At the same time, tool 68' allows purging of old grease through a hollow body structure thereof. Thereupon, a grease gun is connected to one of the fittings 54' or 58', for example, the fitting 54'. Upon pressured insertion of grease through this fitting, such grease fills cavity 52a' at the outer bearing 24a'. Circumferential cavity 52a' is sealed between the inner bore 92 of the drive axle housing spindle 82 and the drive axle shaft by a sealing assembly 94. An alternate spindle bore 92' and axle shaft double seal 94' are depicted in FIG. 4. New grease flows through bearing 24a' displacing old grease. Grease gathers in circumferential area 88 and is expelled from the hub by way of purging port 40' and servicing purge tool 68'. Thereupon the other grease fitting 58' is utilized to direct grease through the longitudinal passageway 60' to circumferential area 46' at the rear of the inner bearing 24'. In accordance with varying applications, the hub may have multiple sets of inner and outer greasing fittings 54' and 58' and respective longitudinal passages. Passage 60' may branch into multiple ports at junction 70' to more uniformly communicate with circumferential greasing space 46'. With the insertion of grease through the flange grease fittings, grease will fill end circumferential areas 52a' and 46', pack both inner and outer bearings in an axial direction with new grease, fill circumferential area 88 and groove 34' in seal 26' with new grease and force old grease and contaminants out the purging port 40'. This purged grease can be collected and examined.

Thereupon the purge and vent sealing tool 68' is removed and purging port plug 48' reinstalled. The hub is now vented through the interior axle housing by way of vent port 90 and the bearings are maintained In circumferential grease raceways by hub interior seal 26'.

In rotative operation of the hubs hereof, centrifugal force maintains both bearings in circumferential grease raceways created for the inner and outer bearings. Also maintained in usage is hub interior vent 90 assuring full vented non-pressurized lubrication to minimize seepage or failure at seal 44'. Furthermore, as in the FIG. 1 embodiment, in the event of bearing failure, a catastrophic situation is reduced to a much less expensive repair by virture of hub interior seal 26' functioning as a fail safe sleeve bearing and saving the spindle and hub, while reducing the risk of hub-wheel-tire to axle separation. Also, hub interior seal inner annular radial grooves 36' hold lubricant to further assist in a fail-safe operation. Also, as in the FIG. 1 embodiment, the design of FIG. 3 maintains the bearing in a grease raceway free of voids and contaminants in a vented non pressurized hub, thus maintaining the integrity of lubrication and seals for extended service life and reduced wheel and maintenance costs.

Figure 5:
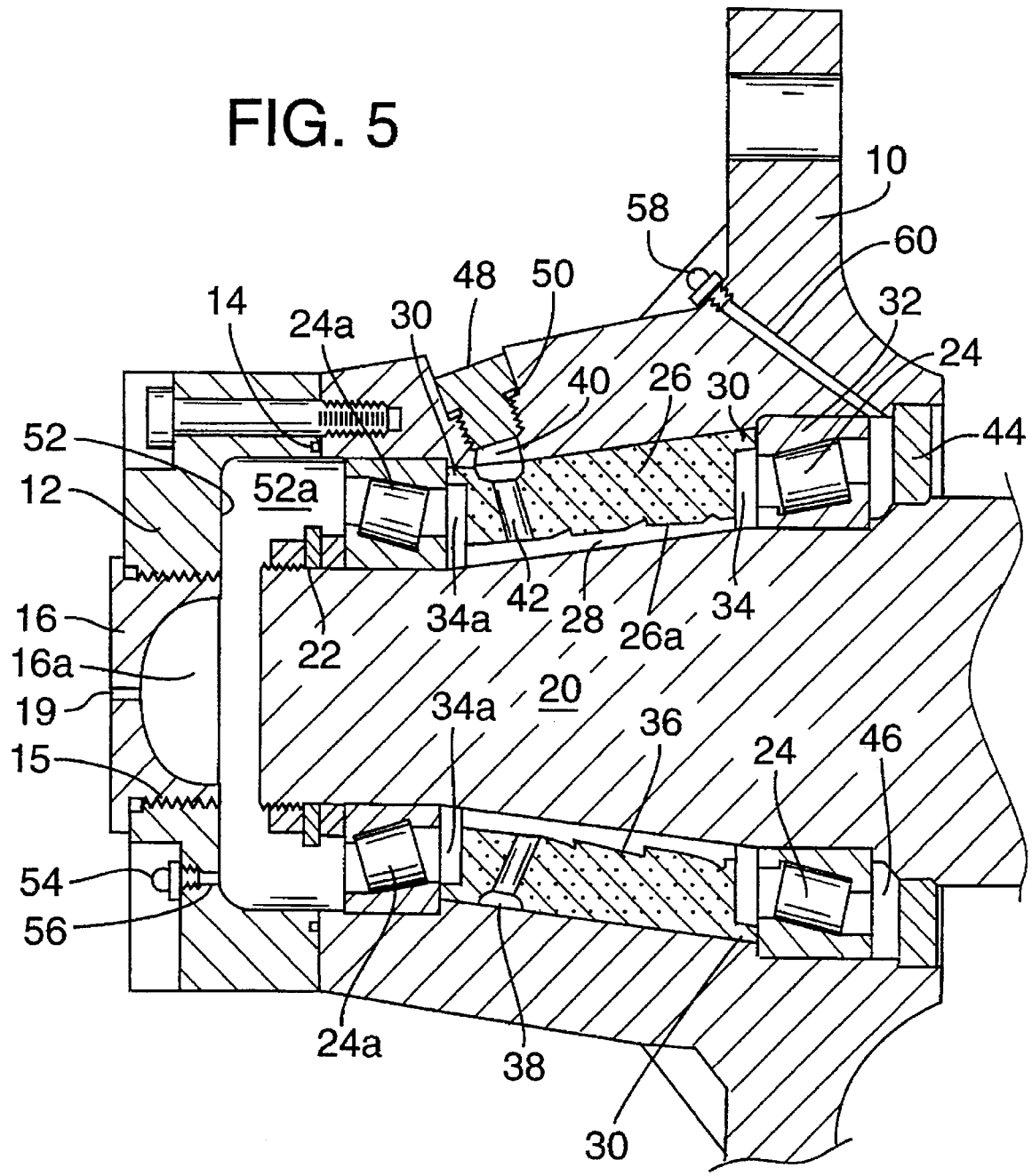
FIG. 5 is a view similar to FIG. 1 but showing a modified positioning of one of the grease passageways in the hub.

FIG. 5 shows another embodiment of the invention. In this embodiment, the grease fitting 58" to the inner bearing is mounted in a recessed portion of the hub 10 which is close to the wheel flange and a port 60" is made in the hub that, leads to the inner greasing area 46. Aside from the location of grease fitting 58", the remaining structure of this embodiment is identical to FIGS. 1 and 3 and the regreasing function is identical to that described in connection therewith.

Thus, a primary benefit of the present invention is to provide a hub structure that allows wheel bearings to be greased in a fast and efficient manner and without taking the wheel and/or bearing assemblies off the axle. Another feature of the present structure is that it utilizes centrifugal force from wheel rotation to maintain reservoir lubrication of the bearings. The design keeps the grease from being able to escape the bearings in that the grease, in rotation of the hub, seeks a centrifugal level in 52a, 34a, and 46 and 34 and the same in the other embodiment. Furthermore, venting is provided so that thermal expansion of the grease and parts of the wheel do not cause pressured damage of the inner grease seal or related brake parts.

The invention thus achieves the important advantage of using grease for lubricating wheel hubs, and particularly heavy duty hubs such as those on trucks or trailers. As stated before applicant has taken advantage of new developments in grease to provide, with his specially designed hub, efficient and fast packing of the wheel bearings.

It is to be understood that the forms of my invention herein shown and described are to be taken as preferred examples of the same and that various changes in the shape, size and arrangement of parts may be resorted to without departing from the spirit of my invention, or the scope of the subjoined claims.

Having thus described our invention, we claim:

1. A shaft re-greasing device for a wheel and supporting spindle therefor of the type having inner and outer bearings, comprising:

a hub having forward and rearward end portions and being rotatably supported on the outer and inner bearings, respectively, greasing means for the bearings including a first longitudinal greasing passageway in said hub leading to the forward side of the outer bearing, a second longitudinal greasing passageway in said hub leading to the rearward site of the inner bearing, and purging passageway means on said hub between the inner and outer bearings and between first and second greasing passageways whereby upon pressured grease being forced into said greasing passageways, new grease is forced in an axial direction through the bearings and old grease and contaminants are purged through said purging passageway means.

2. The shaft re-greasing device of claim 1 wherein said hub between the bearings has an inner bore of greater diameter than the outer diameter of the spindle to form a space therebetween, and an annular seal in said space defines said purging passageway means therebetween.

3. The shaft re-greasing device of claim 2 wherein the purging passageway means forms a storage area for grease, a inner surface of said annular seal including at least one annular groove therein for storage of grease.

4. The shaft re-greasing device of claim 2 wherein the purging passageway means forms a storage area for grease, said seal also includes radial extensions on the ends thereof in communication with the purging passageway means.

5. The shaft re-greasing device of claim 1 wherein said hub includes an outer end cup having an inner recessed area forming a reservoir for grease that maintains the bearings in grease by centrifugal force of said hub when rotating on the spindle.

6. The shaft re-greasing device of claim 1 wherein said hub includes an outer end cap having an inner recessed area forming a reservoir for grease that maintains the bearings in grease by centrifugal force of said hub by rotating on the spindle, and vent means in said cap to prevent buildup of pressure in said hub as a result of operational, thermal, and barometric changes.

7. The shaft re-greasing device of claim 1 wherein said hub includes an outer end cap having an inner recessed area forming a reservoir for grease that maintains the bearings in grease by centrifugal force of said hub when rotating on the spindle, and vent means in said cap to prevent buildup of pressure in said hub as a result of operational, thermal, and barometric changes, said outer end cup having a front opening and a removable plug in said opening having said vent means therein for use during running operation of the hub, and a non-venting plug arranged for substitution for said removable plug during a greasing operation.

8. The shaft re-greasing device of claim 7 wherein said non-venting plug is sufficiently enlarged to consume some of the inner recessed area of said outer end cap to conserve on grease and to create a vented expansion void upon the removal of said plug.

9. The shaft re-greasing device of claim 1 wherein said hub is operational with a drive axle having a flanged end that forms with a drive axle housing spindle and outer bearing a reservoir for grease that is forced into the bearings by centrifugal force of said hub when rotating on the spindle, and vent means in said drive axle housing spindle communicating a venting passageway between said drive axle and drive axle housing spindle with said purging passageway means.

10. The shaft re-greasing device of claim 9 including sealing plug mounted removably in the purging passageway means for removably closing said purging means.

11. A shaft re-greasing device for a wheel and supporting spindle therefor of the type having inner and outer bearings, comprising:

a hub having forward and rearward end portions and being rotatably supported on the outer and inner bearings respectively, greasing means for the bearings including a first longitudinal greasing passageway in said hub leading to the forward side of the outer bearing, a second longitudinal greasing passageway in said hub leading to the rearward site of the inner bearing, and a purging passageway means on said hub between the inner and outer bearings and between first and second greasing passageways and at least one grease collection area in said hub adjacent the outer side of at least one of the bearings and arranged under centrifugal force of hub rotation to supply grease flow to the bearings.

12. The shaft regreasing device of claim 11 wherein said hub includes a front closure having an inner recessed area forming at least a portion of said grease collection area.

* * * * *

UNITED STATES PATENT AND TRADEMARK OFFICE
CERTIFICATE OF CORRECTION

PATENT NO. : 5,658,053

DATED : August 19, 1997

INVENTOR(S) : R. Lee Vencill and Robert E. Vencill

It is certified that error appears in the above-identified patent and that said Letters Patent is hereby corrected as shown below:

Column 6, line 34, "site" should read: --side--.

Column 6, line 50, "a" should read: --an--.

Column 6, line 57, "cup" should read: --cap--.

Column 7, line 7, "cup" should read: --cap--.

Column 8, line 3, "purging" should read: --vent--.

Column 8, line 14, "site" should read: --side--.

Signed and Sealed this

Twenty-fifth Day of November, 1997

*Attest:*

BRUCE LEHMAN

*Attesting Officer*   Commissioner of Patents and Trademarks